US 8,353,695 B2

(12) United States Patent
Takahashi

(10) Patent No.: US 8,353,695 B2
(45) Date of Patent: Jan. 15, 2013

(54) DIE FOR FORMING HONEYCOMB STRUCTURE

(75) Inventor: Hironori Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 602 days.

(21) Appl. No.: 12/562,382

(22) Filed: Sep. 18, 2009

(65) Prior Publication Data
US 2010/0074982 A1  Mar. 25, 2010

(30) Foreign Application Priority Data

Sep. 24, 2008 (JP) ................. 2008-244259
Aug. 4, 2009 (JP) ................. 2009-181586
Sep. 17, 2009 (JP) ................. 2009-215161

(51) Int. Cl.
B29C 47/20 (2006.01)

(52) U.S. Cl. .............. 425/380; 264/177.12; 425/461; 425/467

(58) Field of Classification Search .......... 425/380, 425/461, 467; 264/177.12; 428/469, 472, 428/627, 698
See application file for complete search history.

(56) References Cited

U.S. PATENT DOCUMENTS

| 2002/0060206 | A1* | 5/2002 | Katayama et al. ............. 219/77 |
| 2006/0034972 | A1 | 2/2006 | Takahashi et al. |
| 2007/0184253 | A1* | 8/2007 | Mizuno et al. ................ 428/212 |
| 2008/0078920 | A1 | 4/2008 | Takahashi et al. |
| 2008/0230590 | A1 | 9/2008 | Takahashi et al. |
| 2009/0230176 | A1 | 9/2009 | Takahashi |
| 2009/0232927 | A1 | 9/2009 | Takahashi et al. |

FOREIGN PATENT DOCUMENTS

| JP | 2006-051682 A1 | 2/2006 |
| JP | 2007-181976 A1 | 7/2007 |

* cited by examiner

Primary Examiner — Yogendra Gupta
Assistant Examiner — Joseph Leyson
(74) Attorney, Agent, or Firm — Burr & Brown

(57) ABSTRACT

A joined article in which a first metal member made of a tungsten carbide base cemented carbide and a second metal member made of a martensitic stainless steel having a carbon equivalent of 2.5 to 3.5 and containing 0.030 mass % or less of sulfur are joined. The martensitic stainless steel having the carbon equivalent of 2.5 to 3.5 is preferably at least one selected from the group consisting of SUS431, SUS420J1, SUS420J2, SUS410, SUS410J1, S-STAR, PROVA-400, HPM38, STAVAX ESR, and SUS403 in the joined article. There is disclosed a joined article in which the lowering of the strength of a second metal member around a joining interface thereof is prevented.

2 Claims, 4 Drawing Sheets

DIE FOR FORMING HONEYCOMB STRUCTURE

BACKGROUND OF THE INVENTION

1. Field of the Invention

The present invention relates to a joined article and a die for forming a honeycomb structure. More particularly, it relates to a joined article and a die for forming a honeycomb structure in which the lowering of strength around a joining interface is prevented.

2. Description of the Related Art

Heretofore, a joined article of a tungsten carbide base cemented carbide and a stainless steel is used in a die for forming a ceramic honeycomb structure (a honeycomb structure forming die), a precision mold, a die, a plug and the like.

As the honeycomb structure forming die, for example, there is used a die including a joined article (a die base member) obtained by joining a plate-like member made of the stainless steel and provided with back holes for introducing a forming material, and a plate-like member made of the tungsten carbide base cemented carbide and provided with slits connected to the back holes to form the forming material into a lattice-like shape (e.g., see JP-A-2006-051682 and JP-A-2007-181976).

In the honeycomb structure forming die, one surface of the die base member is usually provided with the slits each having a width corresponding to the thickness of each partition wall of a honeycomb structure and having a lattice-like shape or the like, and the opposite surface (the other surface) thereof is provided with the back holes connected to the slits and having large open areas. Moreover, the back holes are usually provided in positions where the slits intersect with one another (e.g., the intersecting positions of the formed lattice-like slits), and both the back holes and the slits are connected to one another in the die base member. Therefore, a forming material such as a ceramic material introduced from the back holes moves from the back holes having comparatively large inner diameters to the narrow slits, and is extruded as a formed honeycomb structure article from openings of the slits. Thus, slit portions are narrow, and hence a high pressure is applied to the slit portions when the ceramic material passes through the slit portions, whereby the slit portions have an easily worn structure. On the other hand, in the honeycomb structure forming die including the slits formed in the member made of the tungsten carbide base cemented carbide having a high wear resistance, the tungsten carbide base cemented carbide is used to improve the wear resistance.

SUMMARY OF THE INVENTION

In the above honeycomb structure forming die which is a joined article of a tungsten carbide base cemented carbide and a stainless steel and which includes lattice-like slits formed in the tungsten carbide base cemented carbide, however, there is a problem that cell blocks divided by the lattice-like slits fall down (tilt) during use. When the cell blocks of the honeycomb structure forming die fall down, during the forming of a honeycomb structure, defects are generated in cells, and a high-quality honeycomb structure cannot be obtained.

Heretofore, in the honeycomb structure forming die, the stainless steel joined to the tungsten carbide base cemented carbide is a precipitation hardening stainless steel such as SUS630. The stainless steel joined to the tungsten carbide base cemented carbide around an interface between the stainless steel and the tungsten carbide base cemented carbide changes from a martensitic structure to an austenitic structure owing to the elution/diffusion of carbon contained in the tungsten carbide base cemented carbide, and the strength of the stainless steel lowers. In consequence, it is considered that the problem has occurred that the cell blocks of the honeycomb structure forming die fall down.

The present invention has been developed in view of the above problem, and an object thereof is to provide a joined article in which the lowering of a strength around a joining interface is prevented, and a honeycomb structure forming die.

To achieve the above object, according to the present invention, a joined article and a honeycomb structure forming die are provided as follows.

[1] A joined article in which a first metal member made of a tungsten carbide base cemented carbide and a second metal member made of a martensitic stainless steel having a carbon equivalent of 2.5 to 3.5 and containing 0.030 mass % or less of sulfur are joined.

[2] The joined article according to [1], wherein the martensitic stainless steel having the carbon equivalent of 2.5 to 3.5 is at least one selected from the group consisting of SUS431, SUS420J1, SUS420J2, SUS410, SUS410J1, S-STAR, PROVA-400, HPM38, STAVAX ESR, and SUS403.

[3] A die for forming a honeycomb structure comprising the joined article according to [1] or [2], wherein the second metal member is a second plate-like member provided with back holes through which a forming material is introduced, and the first metal member is a first plate-like member provided with slits which are connected to the back holes and through which the forming material is formed into a lattice-like shape.

[4] A joined article (hereinafter referred to as "the second invention" sometimes) in which a first metal member made of a tungsten carbide base cemented carbide and a second metal member made of a tool steel having a carbon equivalent of 2.5 to 3.5 and containing 0.030 mass % or less of sulfur are joined.

[5] The joined article according to [4], wherein the tool steel is HPM31.

According to the joined article of the present invention, the first metal member made of the tungsten carbide base cemented carbide and the second metal member made of the martensitic stainless steel having the carbon equivalent of 2.5 to 3.5 and containing 0.030 mass % or less of sulfur are joined, so that the lowering of a strength around a joining interface can effectively be prevented, and the lowering of a joining strength can be prevented.

According to the present invention, the honeycomb structure forming die includes the joined article of the present invention in which the second metal member is the second plate-like member provided with the back holes for introducing the forming material, and the first metal member is the first plate-like member provided with the slits connected to the back holes and configured to form the forming material into the lattice-like shape. Therefore, the strength around the joining interface between the first plate-like member and the second plate-like member does not lower, and cell blocks divided by the lattice-like slits can effectively be prevented from falling down.

DESCRIPTION OF REFERENCE NUMERALS

Figure 1:
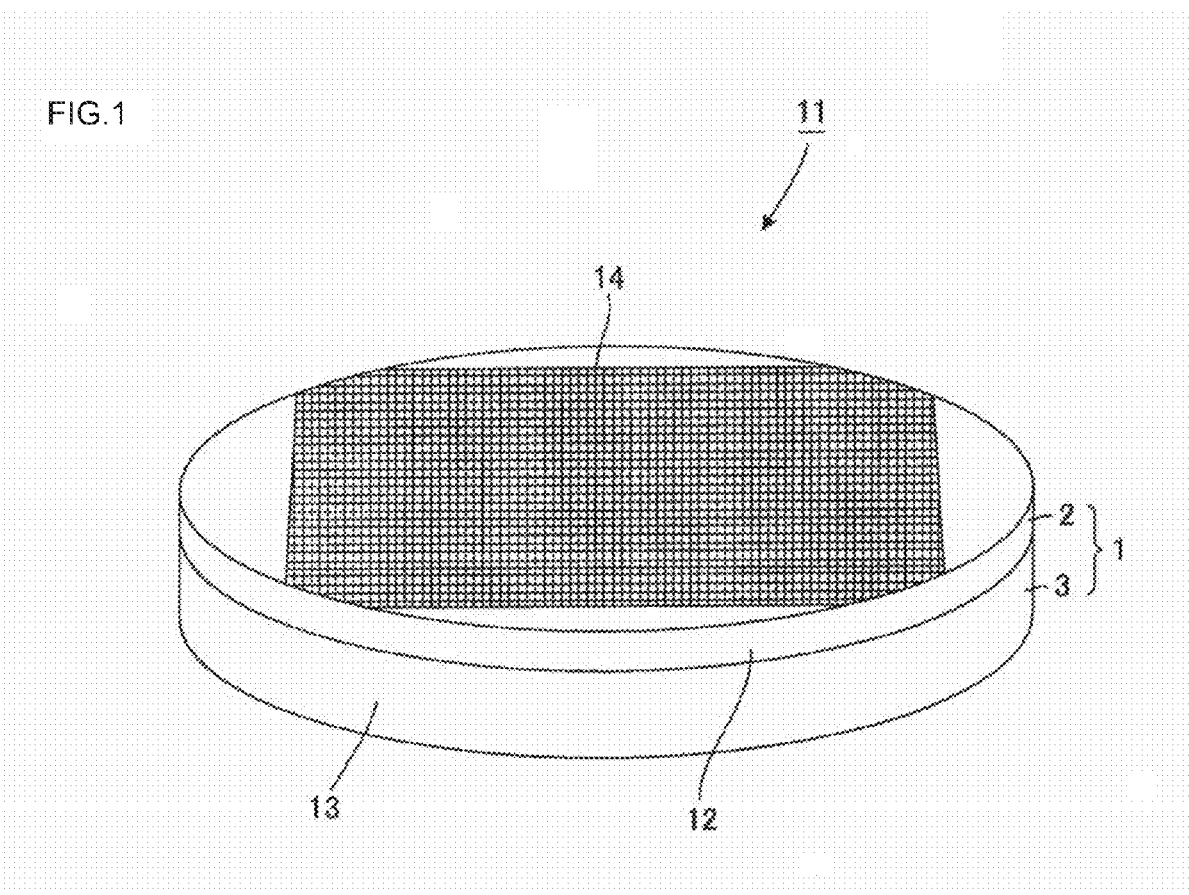
FIG. 1 is a perspective view schematically showing one embodiment of a honeycomb structure forming die of the present invention.

1: joined article, 2: first metal member, 3: second metal member, 11: honeycomb structure forming die, 12: first plate-like member, 13: second plate-like member, 14: slit, 15: back hole, 21: cell block, 22: groove portion, 23: post-like portion, 24: joining interface, L: depth of groove portion (height of post-like portion).

DETAILED DESCRIPTION OF THE INVENTION

Hereinafter, a mode for carrying out the present invention will specifically be described, but it should be understood that the present invention is not limited to the following embodiment and that design is appropriately altered or modified based on the ordinary knowledge of a person with ordinary skill without departing from the scope of the present invention.

(1) Joined Article:

In one embodiment of a joined article of the present invention, a first metal member made of a tungsten carbide base cemented carbide (hereinafter referred to as "the cemented carbide" sometimes) and a second metal member made of a martensitic stainless steel (hereinafter referred to as "the specific stainless steel" sometimes) having a carbon equivalent of 2.5 to 3.5 and containing 0.030 mass % or less of sulfur are joined.

Thus, in the joined article of the present embodiment, the tungsten carbide base cemented carbide (the cemented carbide) and the martensitic stainless steel (the specific stainless steel) having the carbon equivalent of 2.5 to 3.5 and containing 0.030 mass % or less of sulfur are joined, so that the strength of the specific stainless steel around a joining interface between the steel and the cemented carbide does not lower. The deformation (e.g., cell blocks fall down when a honeycomb structure forming die is used), wear and the like of the joined article owing to an external force during the use of the article can be prevented, and the lowering of a joining strength can be prevented. The strength of the specific stainless steel around the joining interface between the steel and the cemented carbide does not lower. This is because even when carbon contained in the cemented carbide is eluted into the specific stainless steel, the hardness of the specific stainless steel around the joining interface between the steel and the cemented carbide does not lower. When the carbon equivalent contained in the stainless steel is large, the stainless steel has an austenitic structure, and has a hardness smaller than that of the martensitic stainless steel. However, in the joined article of the present embodiment, the carbon equivalent of the specific stainless steel indicates a predetermined value, so that even when carbon contained in the cemented carbide is eluted into the specific stainless steel, the specific stainless steel does not have any austenitic structure around the joining interface thereof, and the strength of the specific stainless steel does not lower. Moreover, since the amount (the content) of sulfur in the specific stainless steel is 0.03 mass % or less, the lowering of the joining strength between the cemented carbide and the specific stainless steel can be prevented. Here, in the present embodiment, "to prevent the lowering of the strength around the joining interface thereof" means "to prevent the lowering of the strength of the specific stainless steel (the second metal member) around the joining interface thereof". This means that when the second metal member around the joining interface is compared with another portion of the member, the strength around the joining interface is the same as or higher than that of the other portion. Moreover, "around the joining interface" means "a range of 1.0 mm from the joining interface between the specific stainless steel and the cemented carbide (the joining interface between the first metal member and the second metal member) in the specific stainless steel (the second metal member)". Furthermore, "the strength" is a yield strength, and Vickers hardness Hv can simply be measured and used instead (the yield strength=Vickers hardness Hv×3).

In the joined article of the present embodiment, the tungsten carbide base cemented carbide of the first metal member is an alloy containing at least tungsten carbide, and is preferably an alloy obtained by sintering tungsten carbide with at least one metal selected from the group consisting of iron (Fe), cobalt (Co), nickel (Ni), titanium (Ti) and chromium (Cr). The content of tungsten carbide is preferably 50 to 99 mass %. As such a tungsten carbide base cemented carbide, a tungsten carbide base cemented carbide using cobalt (Co) as a combining material is preferable. Specifically, a tungsten carbide base cemented carbide (WC—Co) containing 0.1 to 50 mass % of cobalt is preferable. Such a tungsten carbide base cemented carbide has especially excellent wear resistance and mechanical strength.

Moreover, in the joined article of the present embodiment, the carbon equivalent is a carbon equivalent (Ceq) in the alloy as defined in JIS5103, and a calculating equation is represented by "Ceq=C+Si/24+Mn/6+Ni/40+Cr/5+Mo/4+V/14" in which components such as C and Si are represented by mass % of each component in the alloy. The carbon equivalent of the specific stainless steel of the second metal member is preferably 2.5 to 3.5, more preferably 2.6 to 3.3. The carbon equivalent of the specific stainless steel of the second metal member is set to such a range, whereby it is possible to effectively prevent the lowering of the strength of the joined article around the joining interface between the first metal member and the second metal member. When the carbon equivalent is larger than 3.5, carbon contained in the cemented carbide is eluted into the specific stainless steel, whereby the structure of remaining austenite increases around the joining interface of the specific stainless steel, and the strength of the steel unfavorably lowers. When the carbon equivalent is smaller than 2.5, the amount of martensite in a steel material decreases, and hence the strength of the steel material unfavorably lowers.

The content of sulfur in the specific stainless steel of the second metal member is 0.030 mass % or less, preferably 0.019 mass % or less, further preferably 0.015 mass % or less. When the content of sulfur exceeds 0.030 mass %, the joining strength between the cemented carbide and the specific stainless steel lowers, and the peeling of a joined portion easily occurs. In addition, the content of carbon in the specific stainless steel constituting the second metal member is preferably 0.10 to 0.95 mass %, more preferably 0.13 to 0.75 mass %, particularly preferably 0.17 to 0.40 mass %. When the content of carbon is below 0.10 mass %, elution of carbon from the cemented carbide to the specific stainless steel may easily be caused. In this case, since the cemented carbide becomes brittle, the bonding strength between the cemented carbide and the specific stainless steel may fall off to decrease bonding reliability. When the content of carbon exceeds 0.95 mass %, tenacity of the specific stainless steel may fall off to easily cause a crack upon use.

The specific stainless steel of the second metal member is a martensitic stainless steel. In the joined article of the present embodiment, "the martensitic stainless steel" is a stainless steel which contains 11% or more of chromium and which forms a martensitic phase by a quenching treatment. Examples of the stainless steel other than the martensitic stainless steel include an austenitic stainless steel and a precipitation hardening stainless steel, and these stainless steels are not included in the specific stainless steel as the constituent material of the joined article of the present embodiment. Here, "the austenitic stainless steel" is a stainless steel which forms a stable austenitic phase by use of a large amount of additive material. Moreover, "the precipitation hardening stainless steel" is a stainless steel having a high hardness obtained by generating a fine intermetallic compound in a martensite ground by a precipitation hardening heat treatment. The austenitic stainless steel has a large carbon equivalent, and low hardness and strength as compared with the martensitic stainless steel. Moreover, the precipitation hardening stainless steel has a carbon equivalent approximately equal to that of the martensitic stainless steel on occasion. However, the precipitation hardening stainless steel originally contains a small amount of martensite, so that when carbon is eluted (the content of carbon increases), the steel is easily influenced, and the hardness noticeably lowers.

The specific stainless steel of the second metal member is preferably at least one selected from the group consisting of SUS431, SUS420J1, SUS420J2, SUS410, SUS410J1, S-STAR, PROVA-400, HPM38, STAVAX ESR, and SUS403. Among them, SUS431, SUS420J2 or SUS420J1 is further preferable. The composition of SUS420J2 is, for example, "C; 0.26 to 0.4, Si; 1.00 or less, Mn; 1.00 or less, P; 0.040 or less, S; 0.030 or less, Ni; 0.6 or less, Cr; 12 to 14 and Fe; balance", and the composition of SUS420J1 is, for example, "C; 0.16 to 0.25, Si; 1.0 or less, Mn; 1.00 or less, P; 0.040 or less, S; 0.030 or less, Ni; 0.6 or less, Cr; 12 to 14 and Fe; balance". As to SUS431 and SUS420J2, even when carbon is eluted from the cemented carbide, a stable martensitic structure can be obtained by cooling from a joining temperature, and a high hardness can be kept. Moreover, as to SUS420J1, SUS410, SUS410J1 and SUS403, when carbon is eluted from the cemented carbide, owing to the increase of the amount of carbon, the change of the structure occurs in such a direction as to increase the martensitic structure, and hence the strength around the joining interface further increases. Furthermore, "S-STAR" is the trade name of the martensitic stainless steel manufactured by Daido Steel Co., Ltd., and the improvement of SUS420J2. The composition of "S-STAR" is "C; 0.38, Si; 0.9, Cr; 13.5, Mo; 0.1 and V; 0.3" (values shown in a catalog). In addition, "PROVA-400" is the trade name of the martensitic stainless steel manufactured by Nachi-Fujikoshi Corp., and is the improvement of SUS420J2. The composition of "PROVA-400" is "C; 0.4, Si; 0.9, Mn; 0.4, Cr; 13.5, Mo; a minute amount and V; a minute amount" (values shown in a catalog). Moreover, "HPM38" is the trade name of the martensitic stainless steel manufactured by Hitachi Metals, Ltd., and is the improvement of SUS420J2. It is to be noted that "HPM" is the registered trade mark of Hitachi Metals, Ltd. In addition, "STAVAX ESR" is the trade name of the martensitic stainless steel manufactured by Uddeholm KK, and is the improvement of SUS420J2. The composition of "STAVAX ESR" is "C; 0.38, Si; 0.9, Mn; 0.5, Cr; 13.6, and V; 0.3" (values shown in a catalog).

In the joined article of the present embodiment, the composition of the specific stainless steel around the joining interface thereof changes owing to the elution of carbon from the cemented carbide sometimes, but the carbon equivalent of the specific stainless steel as one of the characteristics of the joined article of the present embodiment is the value of the portion of the steel which is not influenced by the elution of carbon.

In the joined article of the present embodiment, the hardness of the second metal member around the joining interface thereof is preferably Hv 350 to Hv 600, further preferably Hv 400 to Hv 550. When the hardness is smaller than Hv 350, the strength of the second metal member around the joining interface thereof lowers sometimes. When the hardness is larger than Hv 600, cooling crack (peeling) occurs in the joining interface sometimes. It is to be noted that the hardness is a value measured by a micro Vickers hardness meter. It is to be noted that the strength of the stainless steel usually increases as the hardness is high. Also in the joined article of the present embodiment, the stainless steel used in the first or second metal member has such a relation that the strength increases as the hardness is high.

The joined article of the present embodiment is used as a die for forming a ceramic honeycomb structure, a precision mold, a die, a plug or the like.

A joined article of the present invention (the second invention) is a joined article in which a first metal member made of a tungsten carbide base cemented carbidebase cemented carbide and a second metal member made of a tool steel having a carbon equivalent of 2.5 to 3.5 and containing 0.030 mass % or less of sulfur are joined. The joined article of the second invention is the above joined article of the present invention in which the martensitic stainless steel is a tool steel. According to such a constitution, the lowering of the strength of the joined article around the joining interface thereof can also effectively be prevented, and the lowering of a joining strength can be prevented.

As the tool steel, HPM31 is preferable. "HPM31" is the trade name of the tool steel (SKD-based) manufactured by Hitachi Metals, Ltd.

Figure 2:
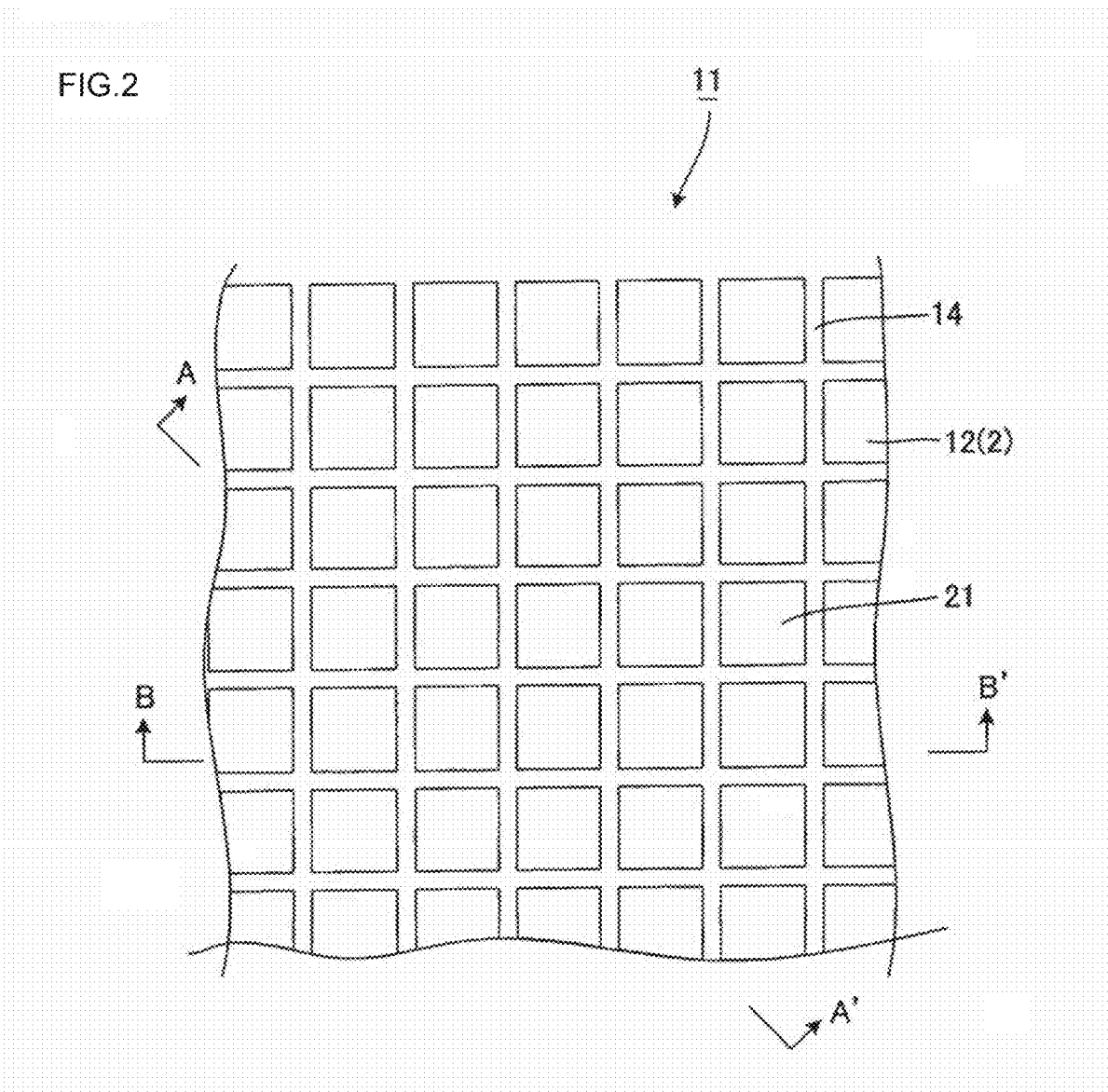
FIG. 2 is an enlarged plan view showing the surface of the die shown in FIG. 1 on the side of a first plate-like member.
Figure 3:
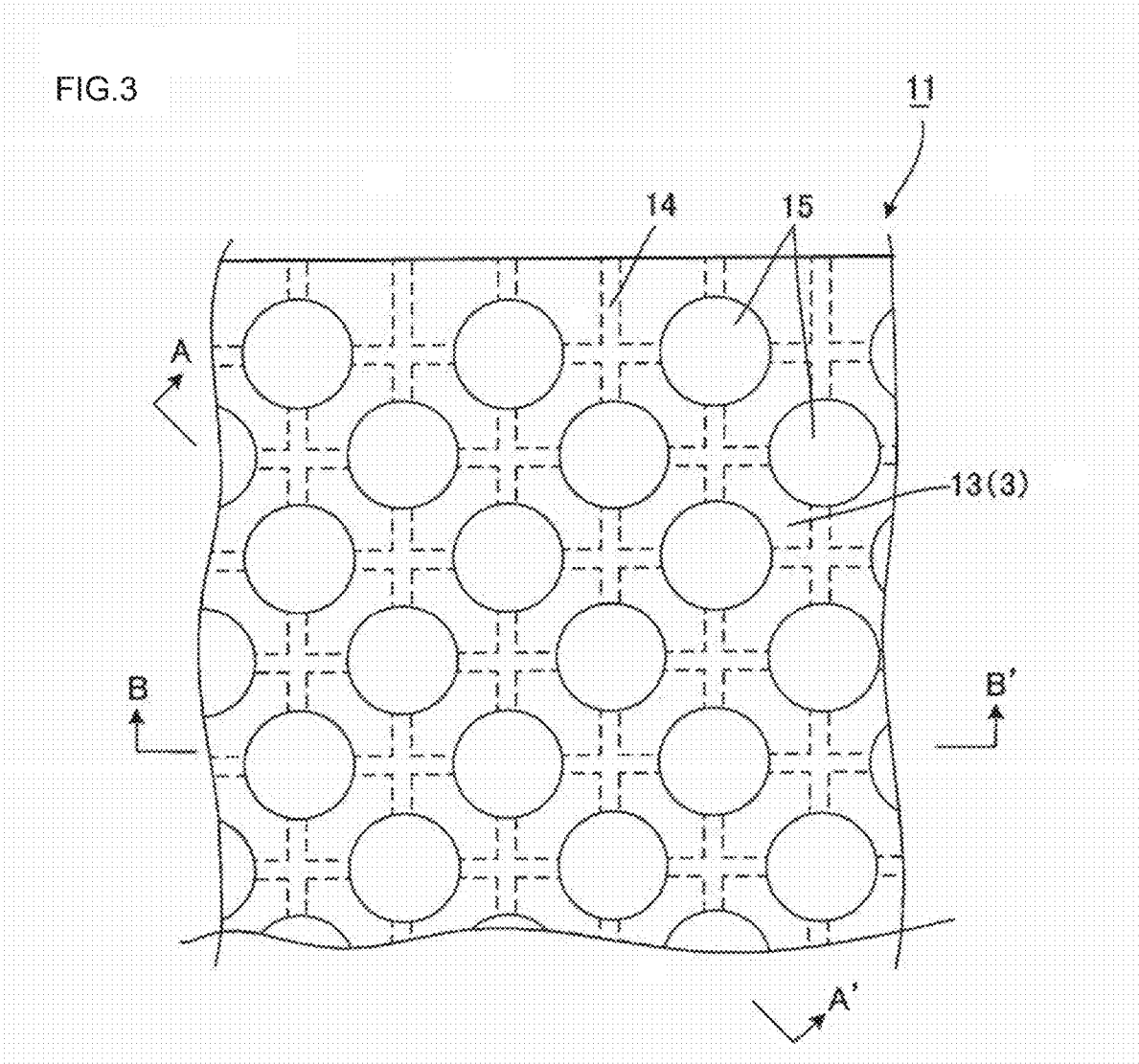
FIG. 3 is an enlarged plan view showing the surface of the die shown in FIG. 1 on the side of a second plate-like member.
Figure 4:
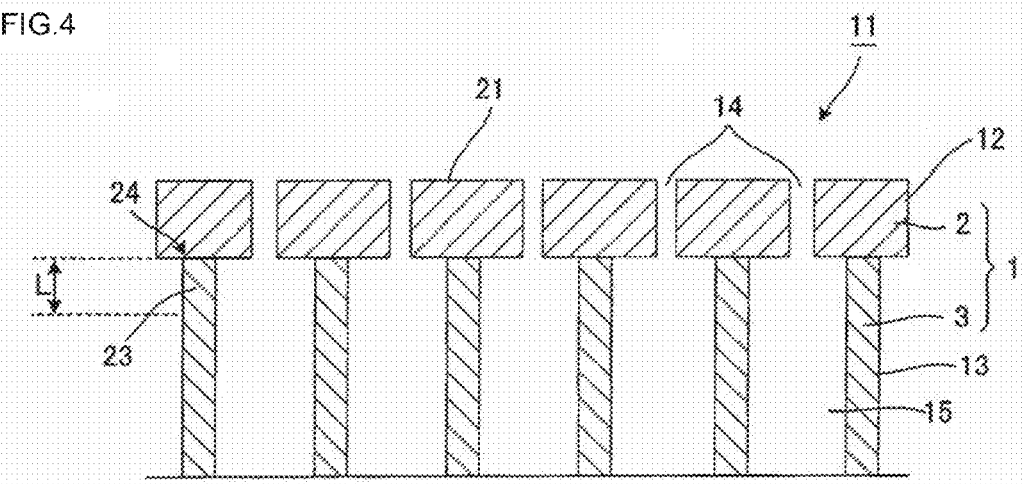
FIG. 4 is a schematic sectional view schematically showing the section of the die cut along the A-A' line of FIG. 2.
Figure 5:
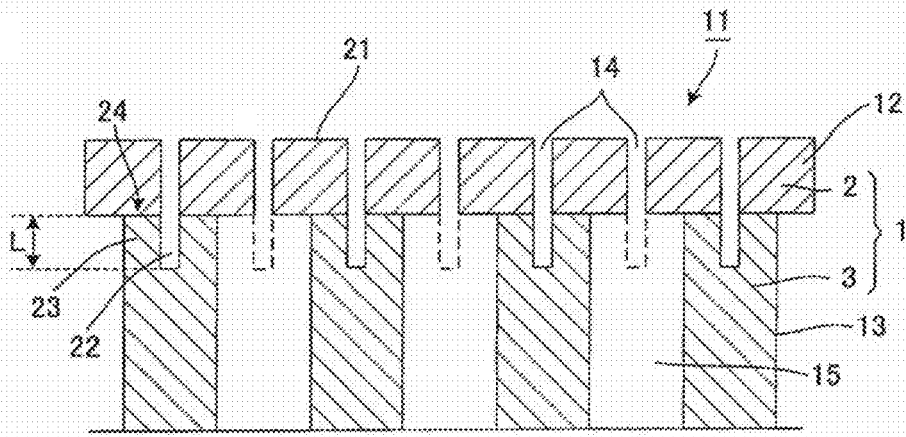
FIG. 5 is a schematic sectional view schematically showing the section of the die cut along the B-B' line of FIG. 2.

(2) Honeycomb Structure Forming Die:

Next, one embodiment of a die for forming a ceramic honeycomb structure (the honeycomb structure forming die) of the present invention including the above joined article of the present invention will be described. FIG. 1 is a perspective view schematically showing the embodiment of the honeycomb structure forming die of the present invention, FIG. 2 is an enlarged plan view showing the surface of the die shown in FIG. 1 on the side of a first plate-like member, and FIG. 3 is an enlarged plan view showing the surface of the die shown in FIG. 1 on the side of a second plate-like member. Moreover, FIG. 4 is a schematic sectional view schematically showing the section of the die cut along the A-A' line of FIG. 2, and FIG. 5 is a schematic sectional view schematically showing the section of the die cut along the B-B' line of FIG. 2.

As shown in FIGS. 1 to 5, a honeycomb structure forming die 11 of the present embodiment includes a joined article 1 in which a second metal member 3 is a second plate-like member 13 provided with back holes 15 for introducing a forming material and in which a first metal member 2 is a first plate-like member 12 provided with slits 14 connected to the back holes and configured to form the forming material into a lattice-like shape. The joined article 1 is the above joined article of the present invention. That is, in the honeycomb structure forming die 11 of the present embodiment, the first plate-like member 12 provided with the slits 14 is made of a tungsten carbide base cemented carbide, and the second plate-like member 13 provided with the back holes 15 is made of a martensitic stainless steel having a carbon equivalent of 2.5 to 3.5 and the sulfur content of 0.030 mass % or less. A ceramic honeycomb structure formed by extrusion using the honeycomb structure forming die 11 of the present embodiment is a ceramic honeycomb structure including porous partition walls which define a plurality of cells extending in the circulating direction of a fluid.

The second plate-like member 13 is provided with slit-like groove portions 22 having a shape corresponding to that of the slits 14 (connected to the slits 14) on the side of a joining interface 24 between the second plate-like member and the first plate-like member 12. Moreover, this second plate-like member 13 has a plurality of post-like portions 23 defined by the groove portions 22 and a part of the back holes 15. It is to be noted that the groove portions 22 are formed so that the back holes 15 are positioned at intersections of the groove portions.

As described above, the honeycomb structure forming die 11 of the present embodiment is provided with the post-like portions 23 on the side of the joining interface 24 of the second plate-like member 13 with respect to the first plate-like member 12, and hence the first plate-like member 12 is joined to the second plate-like member 13 via the post-like portions 23. That is, the honeycomb structure forming die 11 of the present embodiment has a structure in which the first plate-like member 12 is joined to the post-like portions 23 of the second plate-like member 13, and has a structure in which cell blocks 21 are supported by the post-like portions 23 as shown in FIGS. 4, 5. Here, the cell blocks 21 are post-like portions divided by the slits 14 in the first plate-like member 12 provided with the slits 14. As shown in FIGS. 4, 5, the post-like portions 23 are divided by the groove portions 22 and the back holes 15, and hence have a thin and small structure as compared with the cell blocks 21. Therefore, in a case where a ceramic material is extruded by using the honeycomb structure forming die 11, when a load is applied to the cell blocks 21, a stress is easily concentrated on the post-like portions 23. Therefore, the post-like portions 23 need to be made of a highly strong material so that the post-like portions are not deformed. Moreover, the post-like portions 23 of the second plate-like member 13 constitute the joining interface 24 between the second plate-like member and the first plate-like member 12, and hence a region of the second plate-like member 13 "around the joining interface 24" between the second plate-like member and the first plate-like member 12 includes at least a part of the post-like portions 23.

In the honeycomb structure forming die 11 of the present embodiment, as described above, the first plate-like member 12 is made of the tungsten carbide base cemented carbide, and the second plate-like member 13 is made of the martensitic stainless steel having a carbon equivalent of 2.5 to 3.5 and containing 0.030 mass % or less of sulfur. Therefore, the strength of the post-like portions 23 of the second plate-like member 13 positioned around the joining interface does not lower. Even in a state in which the load is applied to the cell blocks 21, the deformation of the post-like portions 23 is suppressed. Consequently, in the honeycomb structure forming die 11 of the present embodiment, the cell blocks 21 can be prevented from falling down during the use of the die.

In the honeycomb structure forming die 11 of the present embodiment, a depth L of each groove portion 22 (the height of each post-like portion 23) is preferably 0.1 to 3.0 mm, further preferably 0.3 to 1.5 mm. When the depth is smaller than 0.1 mm, high forming properties cannot be realized sometimes. When the depth is larger than 3.0 mm, the cell blocks 21 easily fall down sometimes.

FIGS. 1 to 5 show an example in which a substantially square region of the center of the disc-like joined article 1 is provided with the slits 14, the back holes 15 and the groove portions 22, but a region provided with slits and the like is not limited to the above region. For example, a circular region of the center of the joined article 1 may be provided with the slits and the like.

The back holes 15 of the honeycomb structure forming die 11 are through holes for introducing a forming material. There is not any special restriction on the shape of each back hole 15 as long as the introduced forming material can be introduced into the slits 14. In the honeycomb structure forming die 11 shown in FIGS. 1 to 5, the back holes 15 are formed at positions which overlap with intersections of the slits 14. According to such a constitution, when the extrusion is performed by using the honeycomb structure forming die 11 of the present embodiment, the forming material introduced into the back holes 15 can uniformly be spread all over the slits 14, and the high forming properties can be realized. The centers of the back holes 15 are further preferably superimposed onto the intersections of the slits 14. It is to be noted that in the honeycomb structure forming die 11 shown in FIGS. 1 to 5, the back holes 15 are alternately formed with respect to the intersections of the slits 14 (or the groove portions 22).

The size of the opening diameter or the like of each back hole 15 can appropriately be determined by the size of the honeycomb structure forming die 11, the shape of the honeycomb structure formed by extrusion or the like. The size of the opening diameter of each back hole 15 is, for example, preferably 0.1 to 10 mm, further preferably 0.5 to 3 mm. The back holes 15 can be formed by a heretofore known mechanical processing method such as electrochemical machining (ECM processing), electro-discharge machining (EDM processing), laser processing or drilling.

Moreover, the groove portions 22 of the second plate-like member 13 formed on the side of the joining interface 24 also function as buffer portions (buffers) for guiding, into the slits 14, the forming material introduced through the back holes 15. Therefore, when the honeycomb structure is formed by the extrusion, the forming material introduced through the back holes 15 can smoothly be moved without any trouble, and the honeycomb structure can precisely be formed.

There is not any special restriction on the thicknesses of the first plate-like member 12 and the second plate-like member 13, and the thicknesses can appropriately be determined in consideration of the general shapes of the slits 14 and the back holes 15. For example, when the honeycomb structure forming die 11 having a general shape is manufactured, the value of the ratio of the thickness of the second plate-like member 13 with respect to the thickness of the first plate-like member 12 (the thickness of the second plate-like member 13/the thickness of the first plate-like member 12) is preferably 0.1 to 200, further preferably 1 to 10.

Moreover, in the honeycomb structure forming die 11 of the present embodiment, a joining material (a solder material) is preferably disposed between the first plate-like member 12 and the second plate-like member 13 to join the first plate-like member 12 and the second plate-like member 13.

As the joining material, it is preferable to use a material which satisfactorily penetrates at least one of the first plate-like member 12 and the second plate-like member 13. Specifically, it is preferably possible to use "the solder material" made of a metal or an alloy including at least one selected from the group consisting of copper (Cu), silver (Ag), gold (Au), nickel (Ni) and aluminum (Al). There is not any special restriction on the thickness of this solder material, but the thickness is preferably 0.1 to 200 μm, further preferably 1 to 50 μm so that the material satisfactorily penetrates at least one of the first plate-like member 12 and the second plate-like member 13.

Moreover, such a joining material may further contain an additive such as palladium (Pd), silicon (Si), tin (Sn), cobalt (Co), phosphor (P), manganese (Mn), zinc (Zn) or boron (B). The material further containing such an additive can lower the joining temperature and improve joining reliability.

(3) Manufacturing Method of Honeycomb Structure Forming Die:

Next, the manufacturing method of the joined article of the present invention will be described with respect to the manufacturing method of the honeycomb structure forming die. The manufacturing method of the honeycomb structure forming die of the present embodiment is a method for manufacturing one embodiment (the honeycomb structure forming die 11) of the honeycomb structure forming die of the present invention shown in FIGS. 1 to 5.

In the manufacturing method of the honeycomb structure forming die of the present embodiment, first, on one surface of the second plate-like member made of the martensitic stainless steel (the specific stainless steel) having the carbon equivalent of 2.5 to 3.5 and containing 0.030 mass % or less of sulfur (on the side of the joining interface 24 in FIGS. 4, 5), lattice-like groove portions are formed (a step (1)).

As a method for forming the groove portions, a heretofore known method such as grind processing by a c-BN grindstone, end mill processing or electro-discharge machining (EDM processing) can preferably be used.

Moreover, in the manufacturing method of the honeycomb structure forming die of the present embodiment, before or after forming the groove portions in one surface of the second plate-like member, the back holes connecting the other surface of the second plate-like member to the groove portions may be formed. For example, in the honeycomb structure forming die 11 shown in FIGS. 3 to 5, the post-like portions 23 are divided by the back holes 15 and the groove portions 22, and hence the back holes are preferably formed together with the groove portions in this step (1).

There is not any special restriction on a method for forming the back holes, but it is possible to preferably use a heretofore known method such as electrochemical machining (ECM processing), electro-discharge machining (EDM processing), laser processing or drilling.

The back holes may extend through both the surfaces of the second plate-like member (see FIG. 5), and the back holes on the side of the joining interface may be formed so as to communicate with the groove portions without reaching the joining interface.

It is to be noted that in the manufacturing method of the honeycomb structure forming die of the present embodiment, any back hole is not formed in the above step (1), and the back holes may be formed in the subsequent step, for example, a step after joining the first and second plate-like members.

Next, on the surface of the second plate-like member provided with the groove portions 22, the first plate-like member made of the tungsten carbide base cemented carbide (the cemented carbide) is laminated, to join the first and second plate-like members (a step (2)).

Moreover, in the manufacturing method of the honeycomb structure forming die of the present embodiment, when the first and second plate-like members are laminated, the joining material may be disposed between the first plate-like member and the second plate-like member, to join the first and second plate-like members. As such a joining material, it is possible to preferably use "the solder material" described above in the embodiment of the honeycomb structure forming die of the present invention.

When the first and second plate-like members are laminated and joined, the first and second plate-like members are preferably heated to 900 to 1200° C., which is not lower than the melting point of "the solder material", and joined, further preferably heated to 1000 to 1150° C. and joined. In addition, in the method for manufacturing a die for forming a honeycomb structure of the present embodiment, when the first and second plate-like members are joined, it is preferable to apply a pressure of 0.01 to 10 MPa to the first and second plate-like members perpendicularly to the joining faces for the joining. The first and second plate-like members are thus heated, whereby the first and second plate-like members can satisfactorily be joined, and the lowering of the strength of the second plate-like member can be prevented. Moreover, a heating time is preferably one minute to one hour, further preferably 10 to 45 minutes. When the time is shorter than one minute, the first and second plate-like members may not be joined with a high joining strength sometimes. When the time is longer than one hour, carbon contained in the cemented carbide may be easily eluted from the first plate-like member to the second plate-like member to easily lower the strength around the joining interface.

In the manufacturing method of the honeycomb structure forming die of the present embodiment, the joined first and second plate-like members are preferably cooled to at least 500° C. at a temperature lowering speed of 0.1 to 100° C./minute with applying a pressure of 0.01 to 10 MPa perpendicularly to the joining faces. In addition, in the method for manufacturing a die for forming a honeycomb structure of the present embodiment, it is preferable to subject the thus obtained die for forming a honeycomb structure to a reheating treatment of "heating or cooling at a rate of 0.1 to 100° C./minute in a temperature range for causing an austenite transformation or less" 1 to 3 times in such a manner that the tensile stress and compression stress generated on the joining faces. Since the second plate-like member is subjected to a thermal treatment by the reheating treatment, strength of the second plate-like member can be improved. In addition, upon subjecting the die for forming a honeycomb structure to the reheating treatment, it is preferable to perform the reheating treatment with applying a pressure of 0.01 to 10 MPa to the first and second plate-like members perpendicularly to the joining faces. A die for forming a honeycomb structure obtained in this manner is excellent in accuracy, strength, and abrasion resistance.

Next, slits corresponding to the above shape (the forming pattern) of the groove portions 22 and connected to the groove portions 22 are formed from the surface of the first plate-like member opposite to the joining interface between the first plate-like member and the second plate-like member, whereby the honeycomb structure forming die 11 is obtained (see FIGS. 1 to 5) (a step (3)).

There is not any special restriction on a method for forming the slits in the surface of the first plate-like member, but a heretofore known method such as grind processing by a diamond grindstone, electro-discharge machining (EDM processing), or laser processing can preferably be used. Moreover, in the honeycomb structure forming die 11 shown in FIG. 1, the shape (the forming pattern) of the slits 14 is a square lattice-like shape, but in the manufacturing method of the honeycomb structure forming die of the present embodiment, the shape of the slits 14 formed in the first plate-like member is not limited to the square lattice-like shape, and another polygonal lattice-like shape may be used.

Furthermore, the width of each slit formed in the first plate-like member can appropriately be determined by the shape of the honeycomb structure to be formed. It is to be noted that to manufacture the honeycomb structure forming die for forming the general honeycomb structure by the extrusion, the width of each slit is, for example, preferably 5 to 5000 μm, further preferably 10 to 500 μm.

As described above, it is possible to manufacture the honeycomb structure forming die 11 provided with the back holes 15 for introducing the forming material and the slits 14 for forming the forming material into the lattice-like shape as shown in FIGS. 1 to 5.

EXAMPLES

Hereinafter, the present invention will further specifically be described with respect to examples, but the present invention is not limited to these examples.

Example 1

A honeycomb structure forming die was manufactured which was provided with back holes for introducing a forming material and slits for forming the forming material into a lattice-like shape and which was configured to extrude, through the slits, the forming material introduced into the back holes, thereby forming a honeycomb structure.

In Example 1, a first plate-like member made of a tungsten carbide base cemented carbide containing 16 mass % of cobalt and a first plate-like member made of SUS420J2 (C; 0.32, Si; 1.00 or less, Mn; 1.00 or less, P; 0.040 or less, S; 0.008, Ni; 0.6 or less, Cr; 12 to 14 and Fe; balance (unit was mass %)) were joined, and provided with slits and the like, to manufacture a honeycomb structure forming die. The carbon equivalent of SUS420J2 was approximately 3.04. The carbon equivalent was calculated from a chemical component table provided by a mill sheet. As the content of sulfur, a value described in the mill sheet can be employed. However, when any mill sheet is not available, an upper limit value in material specifications or a value obtained by a carbon/sulfur analysis device (a burning-infrared absorption method) is employed.

The first plate-like member had a disc-like surface shape with a diameter of 210 mm, and a thickness of 2.5 mm, and the second plate-like member had a disc-like surface shape with a diameter of 215 mm, and a thickness of 20 mm.

First, the second plate-like member was provided with lattice-like groove portions each having a depth of 1.0 mm and back holes each having an opening diameter of 1.4 mm by electrochemical machining (ECM processing). It is to be noted that the width of each groove portion was set to 0.3 mm, and the pitch of the groove portions was set to 1.37 mm.

Next, "a solder material" which satisfactorily penetrated the second plate-like member was disposed between the second plate-like member and the first plate-like member, to laminate the members, followed by heating to 1100° C. for 0.75 hour, and the first and second plate-like members were joined to cool down to 40° C. or less with applying a pressure of 2 MPa perpendicularly to the joining faces, followed by reheating at 250 to 650° C. Then, the temperature of the first and second plate-like members joined and reheated was lowered to ordinary temperature, and then slits were formed in the first plate-like member, to obtain a honeycomb structure forming die. The slits were formed into a square lattice-like shape by a diamond grindstone. The width of each slit was set to 0.1 mm, and the pitch of the slits was set to 1.37 mm.

As to the honeycomb structure forming die obtained in this manner, the hardness of the second plate-like member in a range of a depth of 0.1 mm to 1.0 mm from a joining interface was measured. The hardness was measured by using a micro Vickers hardness meter manufactured by Akashi Co. on conditions that a load was 300 gf (2.98 N) and a holding time was 15 seconds. Results are shown in Table 1.

Moreover, as to the honeycomb structure forming die, "a cell block falling-down test" was carried out to measure the ease of the falling-down of the cell blocks by the following method. Moreover, by the following method, a plate made of the same material as that of the first plate-like member and a plate made of the same material as that of the second plate-like member were joined by the method for joining the first and second plate-like members as in Example 1, to prepare a joined article, and the joined article was subjected to "a peeling test". Results are shown in Table 2.

(Cell Block Falling-Down Test)

A load was applied to vertexes of cell blocks (ends of the first plate-like member on the side of the surface thereof) in a direction in which the blocks fell down, whereby a displacement of about 0.05 mm was applied to the vertexes of the cell blocks, and a remaining displacement after removing the load was measured. In Table 2, "fell down" means that the cell blocks fell down as much as about 0.0025 mm or more.

(Peeling Test)

A plate (70 mm×70 mm×15 mm (the thickness)) made of the same material as that of the first plate-like member and a plate (68 mm×68 mm×2.5 mm (the thickness)) made of the same material as that of the second plate-like member were joined by the method for joining the first and second plate-like members as in Example 1, to prepare a joined article. Then, the temperature of the joined article was raised to about 350 to 450° C., and a thermal stress due to the difference of a thermal expansion coefficient was applied to the article. Afterward, a peeling state at that time was observed by an ultrasonic searching image device. In Table 2, "none" means that the joined article did not peel at all. "Minutely peeled" means that a portion of less than 10% (excluding "none") of the whole joining area peeled. "Little peeled" means that 10 to 30% of the whole joining area peeled. "Noticeably peeled" means that an area exceeding 50% of the whole joining area peeled.

TABLE 1

| | Hardness (Hv) | | | | | |
|---|---|---|---|---|---|---|
| | 0.1 mm | 0.2 mm | 0.4 mm | 0.5 mm | 0.6 mm | 1 mm |
| Example 1 | 541 | 542 | 545 | 467 | 493 | 518 |
| Example 2 | 574 | 526 | 513 | 523 | 507 | 459 |
| Example 3 | 350 | 390 | 554 | 602 | 605 | 556 |
| Comparative Example 1 | 290 | 300 | 299 | 291 | 291 | 300 |
| Comparative Example 2 | 242 | 227 | 217 | 323 | 353 | 419 |

TABLE 2

| | Material of second plate-like member | Carbon equivalent (Ceq) | Content of carbon (%) | Content of sulfur (%) | Peeling test | Cell block falling-down test |
|---|---|---|---|---|---|---|
| Example 1 | SUS420J2 | 3.04 | 0.32 | 0.008 | None | Did not fall down |

TABLE 2-continued

|  | Material of second plate-like member | Carbon equivalent (Ceq) | Content of carbon (%) | Content of sulfur (%) | Peeling test | Cell block falling-down test |
|---|---|---|---|---|---|---|
| Example 2 | SUS403 | 2.63 | 0.13 | 0.004 | Little peeled | Did not fall down |
| Example 3 | SUS431 | 3.45 | ≦0.2 | <0.015 | Little peeled | Did not fall down |
| Example 4 | SUS420J2 | 2.91 | 0.28 | 0.020 | Minutely peeled | Did not fall down |
| Example 5 | SUS420J1 | 2.65 | 0.17 | 0.012 | None | Did not fall down |
| Example 6 | S-STAR | 3.16 | 0.38 | <0.015 | None | Did not fall down |
| Example 7 | PROVA-400 | 3.29 | 0.4 | <0.015 | None | Did not fall down |
| Example 8 | HPM38 | 3.23 | >0.3 | <0.015 | None | Did not fall down |
| Example 9 | STAVAX ESR | 3.24 | 0.38 | <0.015 | None | Did not fall down |
| Example 10 | HPM31 | 2.68 | >0.3 | <0.015 | None | Did not fall down |
| Comparative Example 1 | SUS440C | 4.68 | — | 0.001 | None | Fell down |
| Comparative Example 2 | SUS630 | 3.39 | — | 0.011 | None | Fell down |
| Comparative Example 3 | SUS329J1 | 6.10 | — | 0.003 | None | Fell down |
| Comparative Example 4 | SUS430 | 3.73 | — | <0.015 | None | Fell down |
| Comparative Example 5 | SUS416 | 2.91 | — | 0.27 | Noticeably peeled | — |
| Comparative Example 6 | HPM77 | 3.48 | — | 0.03 < S <0.10 | Noticeably peeled | — |

Example 2

A honeycomb structure forming die was obtained in the same manner as in Example 1 except that a second plate-like member made of SUS403 (C; 0.13, Si; 0.5 or less, Mn; 1.00 or less, P; 0.040 or less, S; 0.004, Ni; 0.6 or less, Cr; 11.50 to 13 and Fe; balance (the unit was mass %)) was used. The carbon equivalent of SUS403 was 2.63. The carbon equivalent was obtained in the same manner as in Example 1. In the same manner as in Example 1, the hardness was measured, "the ease of the falling-down of cell blocks" was measured, and "a peeling test" was performed. Results are shown in Tables 1, 2.

Example 3

A honeycomb structure forming die was obtained in the same manner as in Example 1 except that a second plate-like member made of SUS431 (C; 0.2 or less, Si; 1.0 or less, Mn; 1.00 or less, P; 0.040 or less, S; less than 0.015, Ni; 1.25 to 2.5, Cr; 15.0 to 17.0 and Fe; balance (the unit was mass %)) was used. The carbon equivalent of SUS431 was 3.45. The carbon equivalent was obtained in the same manner as in Example 1. In the same manner as in Example 1, the hardness was measured, "the ease of the falling-down of cell blocks" was measured, and "a peeling test" was performed. Results are shown in Tables 1, 2.

Example 4

A honeycomb structure forming die was obtained in the same manner as in Example 1 except that a second plate-like member made of SUS420J2 (C; 0.28, Si; 1.0 or less, Mn; 1.00 or less, P; 0.040 or less, S; 0.020, Ni; 0.6 or less, Cr; 12 to 14 and Fe; balance (the unit was mass %)) was used. The carbon equivalent of SUS420J2 was 2.91. The carbon equivalent was obtained in the same manner as in Example 1. "The ease of the falling-down of cell blocks" was measured, and "a peeling test" was performed. Results are shown in Table 2.

Example 5

A honeycomb structure forming die was obtained in the same manner as in Example 1 except that a second plate-like member made of SUS420J1 (C; 0.17, Si; 1.0 or less, Mn; 1.00 or less, P; 0.040 or less, S; 0.012, Ni; 0.6 or less, Cr; 12 to 14 and Fe; balance (the unit was mass %)) was used. The carbon equivalent of SUS420J1 was 2.65. The carbon equivalent was obtained in the same manner as in Example 1. "The ease of the falling-down of cell blocks" was measured, and "a peeling test" was performed. Results are shown in Table 2.

Example 6

A honeycomb structure forming die was obtained in the same manner as in Example 1 except that a second plate-like member made of S-STAR (the trade name of a martensitic stainless steel manufactured by Daido Steel Co., Ltd.) was used. The carbon equivalent of S-STAR was 3.16, and the content of sulfur was less than 0.015 mass % (<0.015). The carbon equivalent was obtained in the same manner as in Example 1. "The ease of the falling-down of cell blocks" was measured, and "a peeling test" was performed. Results are shown in Table 2.

Example 7

A honeycomb structure forming die was obtained in the same manner as in Example 1 except that a second plate-like member made of PROVA-400 (the trade name of a martensitic stainless steel manufactured by Fujikoshi Corp.) was used.

The carbon equivalent of PROVA-400 was 3.29, and the content of sulfur was less than 0.015 mass % (<0.015). The carbon equivalent was obtained in the same manner as in Example 1. "The ease of the falling-down of cell blocks" was measured, and "a peeling test" was performed. Results are shown in Table 2.

Example 8

A honeycomb structure forming die was obtained in the same manner as in Example 1 except that a second plate-like member made of HPM38 (the trade name of a martensitic stainless steel manufactured by Hitachi Metals, Ltd.) was used. The carbon equivalent of HPM38 was 3.23, and the content of sulfur was less than 0.015 mass % (<0.015). The carbon equivalent was obtained in the same manner as in Example 1. "The ease of the falling-down of cell blocks" was measured, and "a peeling test" was performed. Results are shown in Table 2.

Example 9

A honeycomb structure forming die was obtained in the same manner as in Example 1 except that a second plate-like member made of STAVAX ESR (the trade name of a martensitic stainless steel manufactured by Uddeholm KK) was used. The carbon equivalent of STAVAX ESR was 3.24, and the content of sulfur was less than 0.015 mass % (<0.015). The carbon equivalent was obtained in the same manner as in Example 1. "The ease of the falling-down of cell blocks" was measured, and "a peeling test" was performed. Results are shown in Table 2.

Example 10

A honeycomb structure forming die was obtained in the same manner as in Example 1 except that a second plate-like member made of HPM31 (the trade name of a tool steel (SKD-based) manufactured by Hitachi Metals, Ltd.) was used. The carbon equivalent of HPM31 was 2.68, and the content of sulfur was less than 0.015 mass % (<0.015). The carbon equivalent was obtained in the same manner as in Example 1. "The ease of the falling-down of cell blocks" was measured, and "a peeling test" was performed. Results are shown in Table 2.

Comparative Example 1

A honeycomb structure forming die was obtained in the same manner as in Example 1 except that a second plate-like member made of SUS440C (C; 0.95 to 1.2, Si; 1.0 or less, Mn; 1.00 or less, P; 0.04 or less, S; 0.001, Ni; 0.6 or less, Cr; 16 to 18, Mo; 0.75 or less and Fe; balance (the unit was mass %)) was used. The carbon equivalent of SUS440C was 4.68. The carbon equivalent was obtained in the same manner as in Example 1. In the same manner as in Example 1, the hardness was measured, "the ease of the falling-down of cell blocks" was measured, and "a peeling test" was performed. Results are shown in Tables 1, 2.

Comparative Example 2

A honeycomb structure forming die was obtained in the same manner as in Example 1 except that a second plate-like member made of SUS630 (C; 0.07 or less, Si; 1.00 or less, Mn; 1.00 or less, P; 0.040 or less, S; 0.011, Ni; 3.00 to 5.00, Cr; 15.00 to 17.50, Cu; 3.00 to 5.00, Nb+Ta; 0.15 to 0.45 and Fe; balance (the unit was mass %)) was used. The carbon equivalent of SUS630 was 3.39. The carbon equivalent was obtained in the same manner as in Example 1. Moreover, SUS630 is a precipitation hardening stainless steel. In the same manner as in Example 1, the hardness was measured, "the ease of the falling-down of cell blocks" was measured, and "a peeling test" was performed. Results are shown in Tables 1, 2.

Comparative Example 3

A honeycomb structure forming die was obtained in the same manner as in Example 1 except that a second plate-like member made of SUS329J1 (C; 0.08 or less, Si; 1.0 or less, Mn; 1.50 or less, P; 0.04 or less, S; 0.003, Ni; 3.0 to 6.0, Cr; 23.0 to 28.0, Mo; 1.0 to 3.0 and Fe; balance (the unit was mass %)) was used. The carbon equivalent of SUS329J1 was 6.10. The carbon equivalent was obtained in the same manner as in Example 1. In addition, SUS329J1 is an austenite ferrite based stainless steel. "The ease of the falling-down of cell blocks" was measured, and "a peeling test" was performed. Results are shown in Table 2.

Comparative Example 4

A honeycomb structure forming die was obtained in the same manner as in Example 1 except that a second plate-like member made of SUS430 (C; 0.12 or less, Si; 0.75 or less, Mn; 1.0 or less, P; 0.04 or less, S; less than 0.015, Cr; 16.0 to 18.0 and Fe; balance (the unit was mass %)) was used. The carbon equivalent of SUS430 was 3.73. The carbon equivalent was obtained in the same manner as in Example 1. In addition, SUS430 is a ferrite based stainless steel. "The ease of the falling-down of cell blocks" was measured, and "a peeling test" was performed. Results are shown in Table 2.

Comparative Example 5

A honeycomb structure forming die was obtained in the same manner as in Example 1 except that a second plate-like member made of SUS416 (C; 0.15 or less, Si; 1.0 or less, Mn; 1.25 or less, P; 0.06 or less, S; 0.27, Ni; 0.6 or less, Cr; 12.0 to 14.0 and Fe; balance (the unit was mass %)) was used. The carbon equivalent of SUS416 was 2.91. The carbon equivalent was obtained in the same manner as in Example 1. "The ease of the falling-down of cell blocks" was measured, and "a peeling test" was performed. Results are shown in Table 2.

Comparative Example 6

A honeycomb structure forming die was obtained in the same manner as in Example 1 except that a second plate-like member made of HPM77 (the trade name of a martensitic stainless steel manufactured by Hitachi Metals, Ltd.) was used. The carbon equivalent of HPM77 was 3.48, and the content of sulfur exceeded 0.03 mass % and was less than 0.10 mass % (0.03<S<0.10). The carbon equivalent was obtained in the same manner as in Example 1. "The ease of the falling-down of cell blocks" was measured, and "a peeling test" was performed. Results are shown in Table 2.

As seen from Table 1, in the honeycomb structure forming die of Example 1, the hardness of the second plate-like member around the joining interface (a range of 0.5 mm from the joining interface) was of the same degree as that of the hardness in a range exceeding 0.5 mm from the joining interface, and a high hardness was kept. Moreover, also in the measurement of "the ease of the falling-down of the cell blocks", the result indicated that the cell blocks did not easily fall down. In the honeycomb structure forming die of Example 2, the hardness of the second plate-like member around the joining interface was high, and the hardness decreased away from the joining interface. In consequence, it is considered that in the honeycomb structure forming die of Example 2, owing to the elution of carbon, the hardness of the second plate-like member around the joining interface increased, and the strength increased as compared with the alloy before joining. As to the honeycomb structure forming die of Example 3, it is considered that the hardness of the second plate-like member around the joining interface slightly decreased toward the joining interface, but the decrease was not noticeable, and a sufficiently high hardness was kept even when carbon was eluted into the second plate-like member. It is seen that in the honeycomb structure forming die of Comparative Example 1, the carbon equivalent of the second plate-like member was as high as 4.68, and the whole hardness decreased. It is seen that in the honeycomb structure forming die of Comparative Example 2, the carbon equivalent of the second plate-like member indicated a small value of 3.39, the member was made of the precipitation hardening stainless steel, and hence the hardness of the second plate-like member around the joining interface noticeably decreased.

A joined article of the present invention can preferably be used as a honeycomb structure forming die, a precision mold, a die or the like. The honeycomb structure forming die of the present invention can be used when forming a catalyst carrier for an internal combustion engine, a boiler, a chemical reaction device, a fuel cell reformer or the like using a catalytic function, a filter for collecting fine particles from an exhaust gas or the like.

What is claimed is:

1. A die for forming a honeycomb structure comprising a joined article in which a first metal member made of a tungsten carbide base cemented carbide and a second metal member made of a martensitic stainless steel having a carbon equivalent of 2.5 to 3.5 and containing 0.030 mass % or less of sulfur are joined,
    wherein the second metal member is a second plate-like member provided with back holes through which a forming material is introduced, and the first metal member is a first plate-like member provided with slits which are connected to the back holes and through which the forming material is formed into a lattice-like shape.

2. The die for forming a honeycomb structure according to claim 1, wherein the martensitic stainless steel having the carbon equivalent of 2.5 to 3.5 is at least one selected from the group consisting of SUS431, SUS420J1, SUS420J2, SUS410, SUS410J1, S-STAR, PROVA-400, HPM38, STAVAX ESR, and SUS403.

* * * * *